US008506090B2

(12) United States Patent  (10) Patent No.: US 8,506,090 B2
Nicoli et al.  (45) Date of Patent: Aug. 13, 2013

(54) PROJECTION SYSTEM WITH IMAGE ORIENTATION CORRECTION AND CORRESPONDING METHOD

(75) Inventors: Ray L. Nicoli, Seattle, WA (US); Andrew T. Rosen, Lynnwood, WA (US); David Lashmet, Bainbridge Island, WA (US)

(73) Assignee: Microvision, Inc., Redmond, WA (US)

( * ) Notice: Subject to any disclaimer, the term of this patent is extended or adjusted under 35 U.S.C. 154(b) by 387 days.

(21) Appl. No.: 12/728,964

(22) Filed: Mar. 22, 2010

(65) Prior Publication Data

US 2011/0228175 A1  Sep. 22, 2011

(51) Int. Cl.
*G03B 21/14* (2006.01)
*G03B 21/00* (2006.01)
*G03B 21/26* (2006.01)

(52) U.S. Cl.
USPC ............................... 353/69; 353/122; 353/30

(58) Field of Classification Search
USPC ................... 348/739, 744, 745; 353/69, 70, 353/122, 30, 31
See application file for complete search history.

(56) References Cited

U.S. PATENT DOCUMENTS

| 6,359,960 | B1 | 3/2002 | Wahl et al. | |
| 6,456,339 | B1* | 9/2002 | Surati et al. | 348/745 |
| 6,520,647 | B2* | 2/2003 | Raskar | 353/70 |
| 6,538,705 | B1* | 3/2003 | Higurashi et al. | 348/745 |
| 7,213,926 | B2* | 5/2007 | May et al. | 353/69 |
| 7,452,084 | B2* | 11/2008 | Mochizuki | 353/70 |
| 7,465,051 | B2* | 12/2008 | Grueger | 353/28 |
| 2003/0020885 | A1* | 1/2003 | Suzuki | 353/71 |
| 2003/0038928 | A1* | 2/2003 | Alden | 353/122 |
| 2005/0231691 | A1* | 10/2005 | Li | 353/69 |
| 2006/0187184 | A1 | 8/2006 | Miyasaka | |
| 2008/0111976 | A1* | 5/2008 | Takito et al. | 353/121 |

FOREIGN PATENT DOCUMENTS

| JP | 2003-005278 | 1/2003 |
| JP | 2005-347790 | 12/2005 |

* cited by examiner

*Primary Examiner* — Pascal M Bui Pho
(74) *Attorney, Agent, or Firm* — Kevin D. Wills

(57) ABSTRACT

An image projection system (103) includes an image projector (104) and an image orientation device (106). The image orientation device (106) can be configured to cause a reference line (110) associated with an image (108) to remain aligned in a predetermined orientation on a projection surface (109) regardless of projection system motion. A second image orientation device (206) can be included as well. The second image orientation device (206) can be configured to cause portions of an image (208) to move with projection system motion while a reference line (210) remains stable.

21 Claims, 9 Drawing Sheets

PROJECTION SYSTEM WITH IMAGE ORIENTATION CORRECTION AND CORRESPONDING METHOD

BACKGROUND

1. Technical Field

This invention relates generally to image projection devices, and more particularly to an image projection device having an image orientation control device configured to cause a reference line in an image to remain stable regardless of image projection device orientation.

2. Background Art

Projection systems are commonly used in business and personal applications for media presentations and entertainment. While projectors used to be large, heavy devices that were placed on a table or suspended from the ceiling, the advent of compact projection systems, such as those employing lasers, now allows a user to hold a the projection system in the palm of his or her hand.

This "miniaturization" of projection systems has created a new set of issues for users, however. When the projection system is hand held, a shaking hand results in a moving picture that dances around and changes size. This can result in a projected image that is difficult to view.

Thus, there is a need for an improved image projection system capable of being manually held by a user.

Figure 1:
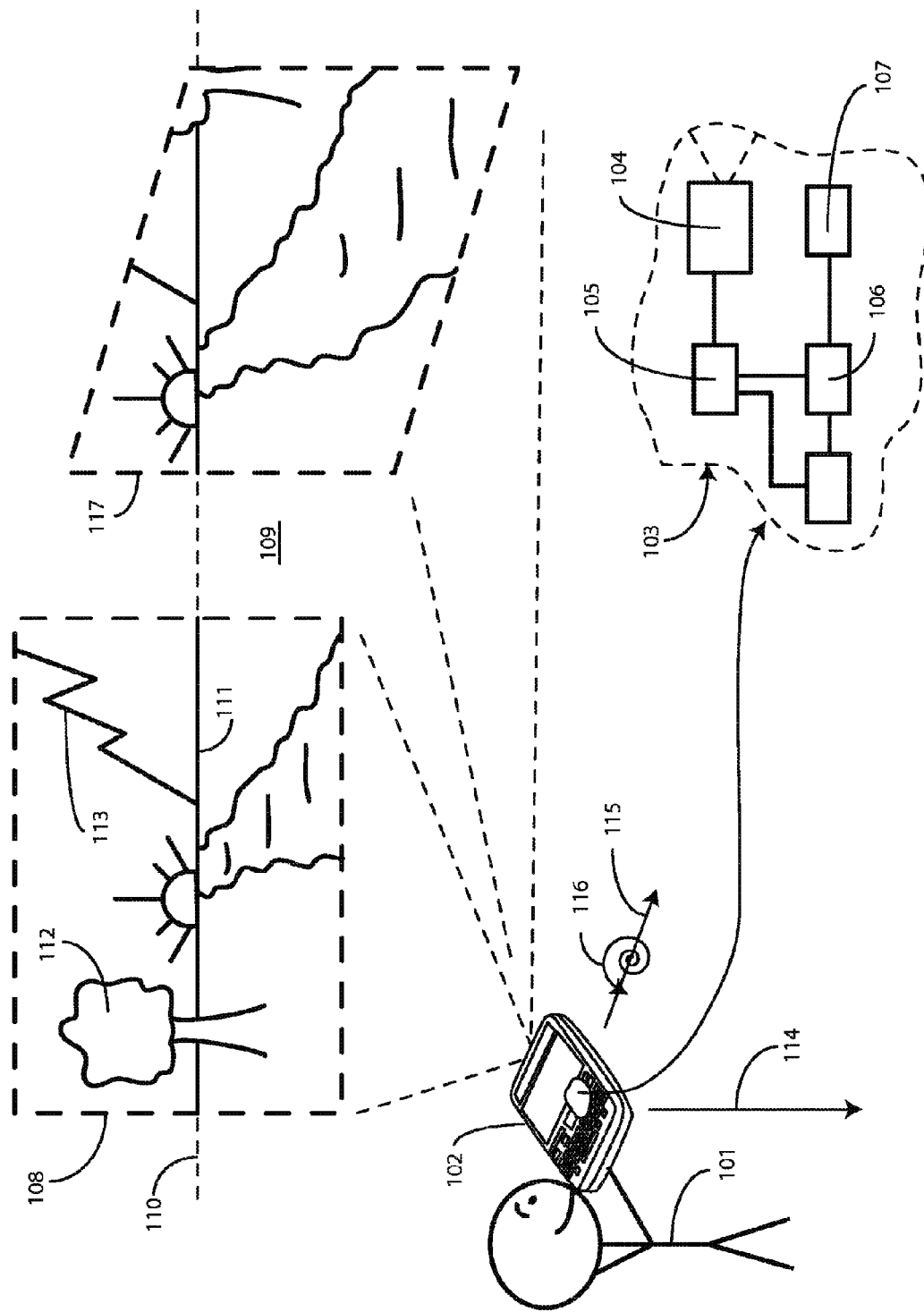
FIG. 1 illustrates one embodiment of a user employing one projection system configured in accordance with embodiments of the invention.

Skilled artisans will appreciate that elements in the figures are illustrated for simplicity and clarity, and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in combinations of method steps and apparatus components related to maintaining a reference line alignment, and optionally controlling some portions of a projected image, as a projection system moves relative to a projection surface. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors and unique stored program instructions that control the one or more processors to implement, in conjunction with certain non-processor circuits, some, most, or all of the functions of maintaining reference line alignment during projection system movement, and optionally controlling movement of portions of a projected image based upon projection system movement, as described herein. The non-processor circuits may include, but are not limited to, microprocessors, scanning mirrors, image encoding devices, memory devices, clock circuits, power circuits, and so forth. As such, these functions may be interpreted as steps of a method to perform reference line management or image portion manipulation. Alternatively, some or all functions could be implemented by a state machine that has no stored program instructions, or in one or more application-specific integrated circuits, in which each function or some combinations of certain of the functions are implemented as custom logic. Of course, a combination of the two approaches could be used. It is expected that one of ordinary skill, notwithstanding possibly significant effort and many design choices motivated by, for example, available time, current technology, and economic considerations, when guided by the concepts and principles disclosed herein, will be readily capable of generating such programs and circuits with minimal experimentation.

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the present invention provide a method and image projection system that is configured to cause a reference line within a projected image to remain aligned in a predetermined orientation along a projection surface while the projection system moves. Said differently, as the yaw, pitch, or roll of the projection system changes, embodiments of the present invention can keep the reference line consistently oriented along a projection surface.

Reference lines within the image can be user defined or arbitrarily set by the image projection device. Examples of reference lines include horizon lines, background lines, landscape lines, non-moving lines comprising a background or set in an image, framing lines, and so forth. Using a landscape horizon as an illustrative example of a reference line, in one embodiment the projection system is configured to detect a direction of gravity and then orient the horizon perpendicular to this direction. As a user moves the projection system, thereby altering one or more of the yaw, pitch, or roll of the projection system, image content may change—as if the user is shining a flashlight in a new direction. However, during movement the projection system is configured to maintain alignment of the horizon along the projection surface. Thus, when the horizon is initially centered within a projected image, and a user moves the beam of the projection system down while inadvertently twisting the projection system, the horizon stays aligned as it was initially—moving up in the image while staying perpendicular to the gravitational direction.

In another embodiment of the invention, the projection system is configured to alter the presentation of one or more portions of the image in response to system movement while maintaining alignment of the reference line. Said differently, as one or more of the yaw, pitch, or roll of the projection system changes, one or more subportions of the image can be configured to move in corresponding amounts to this motion in one embodiment. In another embodiment, the projection system can be set in a motion augmentation mode, in which changes in the yaw, pitch, or roll of the projection system cause greater or lesser motion along the projection surface.

Continuing with the horizon example from above, if the image content being displayed is that of a plane flying above the horizon, in one embodiment the user is able to control alignment of the plane—which is a portion of the image unrelated to the reference line—while keeping the horizon stable. Thus, a user may twist or roll the projection system by fifteen degrees to cause the plane to bank upward at an angle of fifteen degrees while keeping the horizon level.

Embodiments of the present invention offer numerous advantages over prior art projection systems. For example, in prior art projection systems when the system moves relative to a projection surface, the image moves accordingly. If the image includes something that the viewer should perceive as remaining level, such as a horizon, then tilting, shaking and other movement of this reference line can affect the "realism" of a simulation by causing this reference line to move with the image. Such movement can even lead to motion sickness. Embodiments of the present invention allow all or portions of the image to stay stable along to the projection surface as the projection system moves relative to the projection surface. In one embodiment, if the projection system moves right or left, the image correspondingly moves right or left as if a viewer were looking right or left. When doing so, however, one or more reference lines within the image stay stable, thereby rendering the image's appearance "level" to a user.

Embodiments of the present invention employ an image orientation device that is configured to cause a reference line associated with an image or image content to remain aligned in a predetermined orientation along a projection surface regardless of orientation of the image projector. The image orientation device can employ one or more sensors to determine how best to align the reference line. These sensors can include accelerometers, gravitational detectors, optical sensors, laser range finders, gyroscopes, compasses, and so forth. In one sense, projection systems configured with such image orientation devices can be considered to be spatially aware. The term "spatially aware" describes access to any information relating to spatial characteristics of the apparatus. For example, a spatially aware processor within an apparatus may have access to information relating to the position, motion, and/or orientation of the apparatus. The number or type of sensors will be determined by the application and amount of accuracy desired for image orientation adjustments.

Turning now to FIG. 1, illustrated therein is a user 101 employing a hand-held electronic device 102 having one embodiment of a projection system 103 configured in accordance with embodiments of the invention. The projection system 103, shown to the right in an enlarged view, includes an image projector 104, a processor 105, and an image orientation device 106. Further details of these components will be described below in the discussion of FIG. 4.

In one embodiment, the image orientation device 106 includes a sensor 107. The sensor 107 will be discussed in more detail below in the discussion of FIG. 5. The sensor 107 can include one or more spatial awareness detection devices. Additionally, the sensor 107 can include different types of devices. Examples of components that can be used with the sensor 107 include chemical detectors, gravity detectors, positional sensors, accelerometers, magnetometers, thermal sensors, motion sensors, optical sensors, orientation sensors, external input sensors, time sensors, distance sensors, gyroscopes, altimeters, compasses, and the like.

The sensor 107 delivers spatial awareness information to the image orientation device 106. This information can include information relating to spatial position of the projection system 103, the direction of gravity, the rotational orientation of the projection system 103, and motion of the projection system 103. The spatial awareness information generally is information relating to the position, motion, or orientation of the projection system 103.

The image projector 104 is configured to project an image 108 on a projection surface 109. The image 108 can be a still image or a video image. The image 108 can be recorded imagery, such as photographs, computerized tomography scans, or recorded video, or alternatively can be generated or synthesized content, such as computer generated graphics.

The image projector 104 may be any type of projector suitable for inclusion in a portable electronic device 102. For example, in one embodiment, the image projector 104 is configured as a small, light, battery-operated projector. For illustration purposes, some embodiments of the image projector 104 described herein will be configured as laser-based systems, such as a micro-electro mechanical system (MEMS)-based projector that includes an electromagnetic driver and one or more resonating mirrors or light modulators. However, it will be clear to those of ordinary skill in the art that embodiments of the invention are not so limited. Laser-based scanning mirror systems described herein may be substituted with other types of projection systems, such as a digital light projection systems or liquid crystal on silicon systems using any of light emitting diode light sources, laser light sources, color filters, and so forth.

The image 108 includes a reference line 110 associated therewith. While "line" is used to describe this reference, it will be clear to those of ordinary skill in the art having the benefit of this disclosure that the reference line 110 need not to be straight. It can rather be a multi-segmented line or curved non-linear line as well. The reference line 110 serves as a reference delimiter within the image 108. For illustration purposes, the reference line 110 of FIG. 1 corresponds to the horizon line 111 in the image 108. Thus, the reference line 110 is a landscape delimiter in this illustrative embodiment. However, where the image 108 includes content other than a landscape, any number of other shapes or objects can serve as the reference line 110. For example, in a picture of a person standing next to a wall, a chair rail or brick and mortar pattern can equally serve as the reference line.

The reference line 110 can be straight or non-straight. In the illustrative embodiment of FIG. 1, the horizon line 111, in and of itself, can serve as the reference line 110. Alternatively, the reference line 110 can pass about other shapes within the image 108, such as the tree 112 or mountains 113 shown in the illustrative image 108 of FIG. 1. Likewise, the reference line 110 itself can appear to waver or undulate at video rates, such as would be the case if the reference line 110 corresponded to moving water or waves. Nevertheless, the reference line 110 effectively marks an image "horizon" that can be oriented perpendicularly to the apparent or real source of gravity. Illustrating by example, a simulation of an ocean filled with swells could still create a reference line 110 or horizon in accordance with embodiments of the present invention.

Note that in the illustrative embodiment of FIG. 1, the reference line 110 is shown for discussion purposes as a simplified, a two-dimensional geometric abstraction, whether straight or curved. In practice, reference lines may also appear as three-dimensional objects by using various three-dimensional projection methods that stimulate human binocular vision. Such methods include anaglyphic techniques, autostereoscopic projections, binocular polarization methods, mixed monochrome/color systems, liquid-crystal shutter glasses, six color three-dimensional systems, eight color three-dimensional systems, and the like. Thus, three-dimensional images are to be understood as possible extensions of the reference line in accordance with embodiments of the present invention. Such a three-dimensional effect can be illustrated by returning to the example of an ocean swell line that marks a horizon. The three-dimensional version of this same example occurs when each wave has apparent breadth, depth and height when seen by a viewer of the projection.

The reference line 110 may be user definable. For example, the user 101 may define the line in a software program using a user interface of the electronic device 102. Alternatively, the user may employ a computer to which the electronic device 102 may connect to define the reference line 110. Alternatively, the electronic device 102 may be configured to set the reference line 110 as well. For example, the processor 105 may be configured to compare successive images of video content to determine which portions change and which remain the same. The processor 105 may then assign the reference line 110 to an easily visible line within the non-changing portion.

As the projection system 103 moves, i.e., as one or more of the yaw, pitch, or roll changes, the image orientation device 106 is configured to cause the reference line 110 associated with the image 108 to remain aligned in a predetermined orientation along the projection surface 109. In the illustrative embodiment of FIG. 1, the horizon line 111 serves as the reference line 110. As such, the image orientation device 106 may employ a gravity direction detector as the sensor 107 to determine the direction of gravity 114. The image orientation device 106 can then be configured to orient the horizon line 111 substantially perpendicular with the direction of gravity 114.

In one embodiment, the image orientation device 106 causes the reference line 110 to remain aligned in the predetermined orientation along the projection surface 109 regardless of the orientation of the image projector 104. In the illustrative embodiment of FIG. 1, as the user moves 115 to the right, thereby changing the yaw, and then rotates 116 the projection system 103 clockwise, thereby changing the roll, a second image 117 is projected. The second image 117 of FIG. 1 shows different content. However, the reference line 110 has remained in a predetermined orientation—substantially perpendicular to the direction of gravity 114—along the projection surface 109.

The spatially aware system of FIG. 1 thus "knows" through the use of the sensor 107 where the projection system 103 is relative to the projection surface 109 and the image being presented. Said differently, the spatially aware system of FIG. 1 knows the relative yaw, pitch, and roll changes of the projection system 103. The image orientation device 106 is therefore able to change the content being shown, as well as other aspects of the image such as focus or framing, to present an image having a "real-world" horizon that stays substantially perpendicular to the direction of gravity 114. The user 101 can twist and turn the projection system 103 while continually maintaining a stable horizon line 111.

Figure 2:
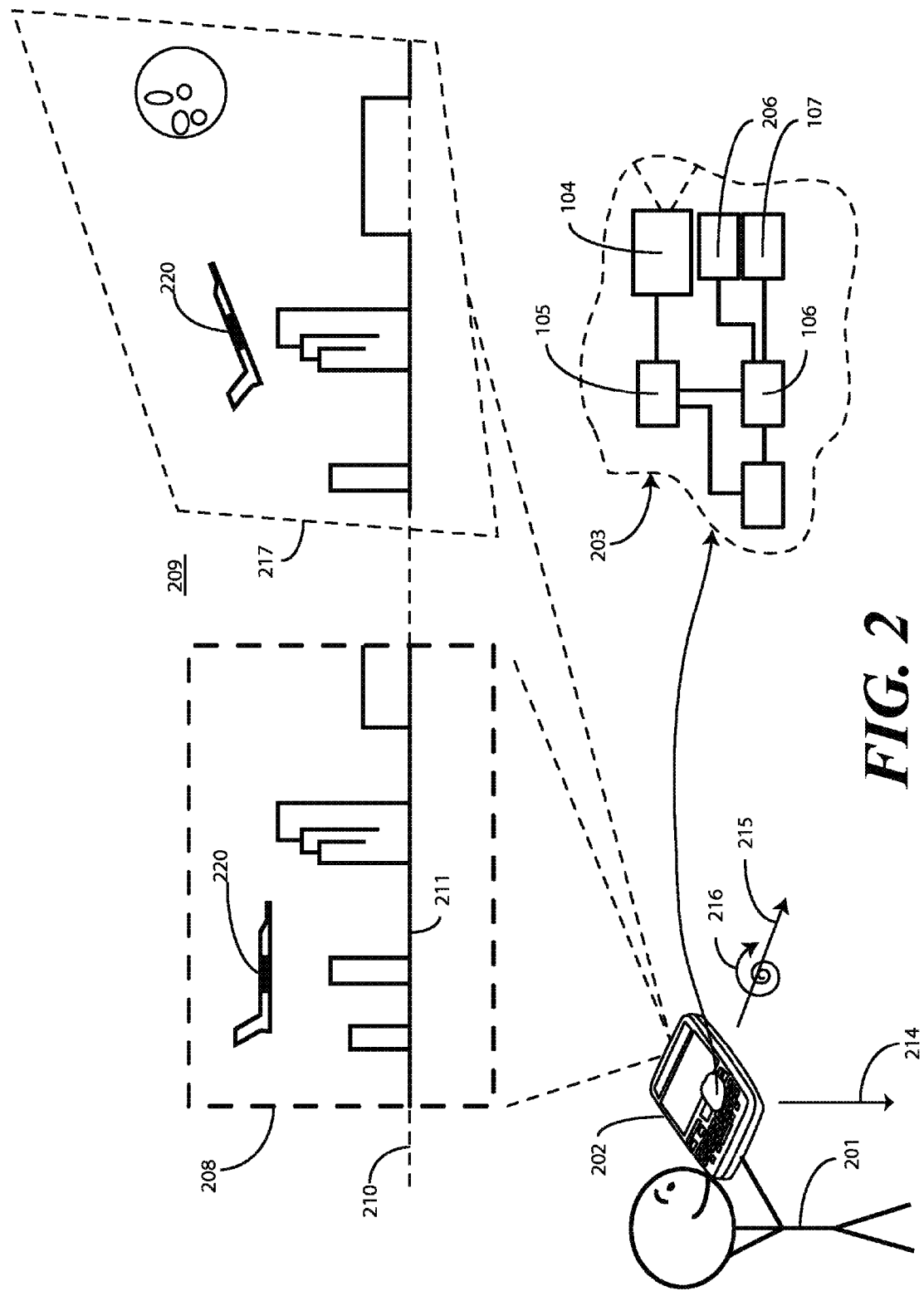
FIG. 2 illustrates one embodiment of a user employing another projection system configured in accordance with embodiments of the invention.

Turning now to FIG. 2, illustrated therein is an alternate embodiment of the invention. Illustrated therein is a user 201 employing a hand-held electronic device 202 having another embodiment of a projection system 203 configured in accordance with embodiments of the invention. The projection system 203, shown to the right in an enlarged view, includes some of the same components shown in FIG. 1, including an image projector 104, a processor 105, an image orientation device 106 and a sensor 107. As with FIG. 1, the image orientation device 106 is configured to cause at least a portion of an image 208 corresponding with a reference line 210 to remain aligned in a predetermined orientation during movement of the projection system 203.

The projection system 203 of FIG. 2 differs from that of FIG. 1 in that it includes a second image orientation device 206 as well. (Note that the second image orientation device 206 can be an extension of or integrated with the first image orientation device 106.) While the first image orientation device 106 is configured to cause the reference line 210 to remain oriented in a predetermined direction along the projection surface 209, the second image orientation device 206 is configured to cause at least one other portion of the image 208, shown in the illustrative embodiment of FIG. 2 as a plane 220, to change its orientation based at least in part on the movement of the projection system 203.

Illustrating by way of example, the user 201 initially causes image 208 to be projected on the projection surface 209. As with FIG. 1, the image orientation device 106 may employ a gravity direction detector as the sensor 107 to determine the direction of gravity 214. The image orientation device 106 can then be configured to orient the horizon, which forms a subject matter line 211 in the image 208, substantially perpendicular with the direction of gravity 214.

The portion of the image 208 shown as the airplane 220, which may be user definable as well, does not correspond with the reference line 210. As such, in one embodiment its orientation is controllable by the user 201. When the user 201 moves 215 the projection system 203 to the right, thereby changing the yaw, and rotates 216 the projection system 203 counterclockwise, thereby changing the roll, a second image 217 is projected. The second image 217 of FIG. 2 shows different content. However, the reference line 210 has remained in a predetermined orientation—substantially perpendicular to the direction of gravity 214—along the projection surface 209. Meanwhile, the second image orientation device 206 causes the portion of the image (airplane 220) unrelated to the reference line 210 to change orientation based at least in part on the movement of the projection system 203. Accordingly, the airplane 220 is shown having moved to the right in image 217, which corresponds to the projection system 203 moving 215 to the right. Further, the airplane 220 has banked upward, which corresponds to the projection system 203 being rotated 216 counterclockwise.

Figure 3:
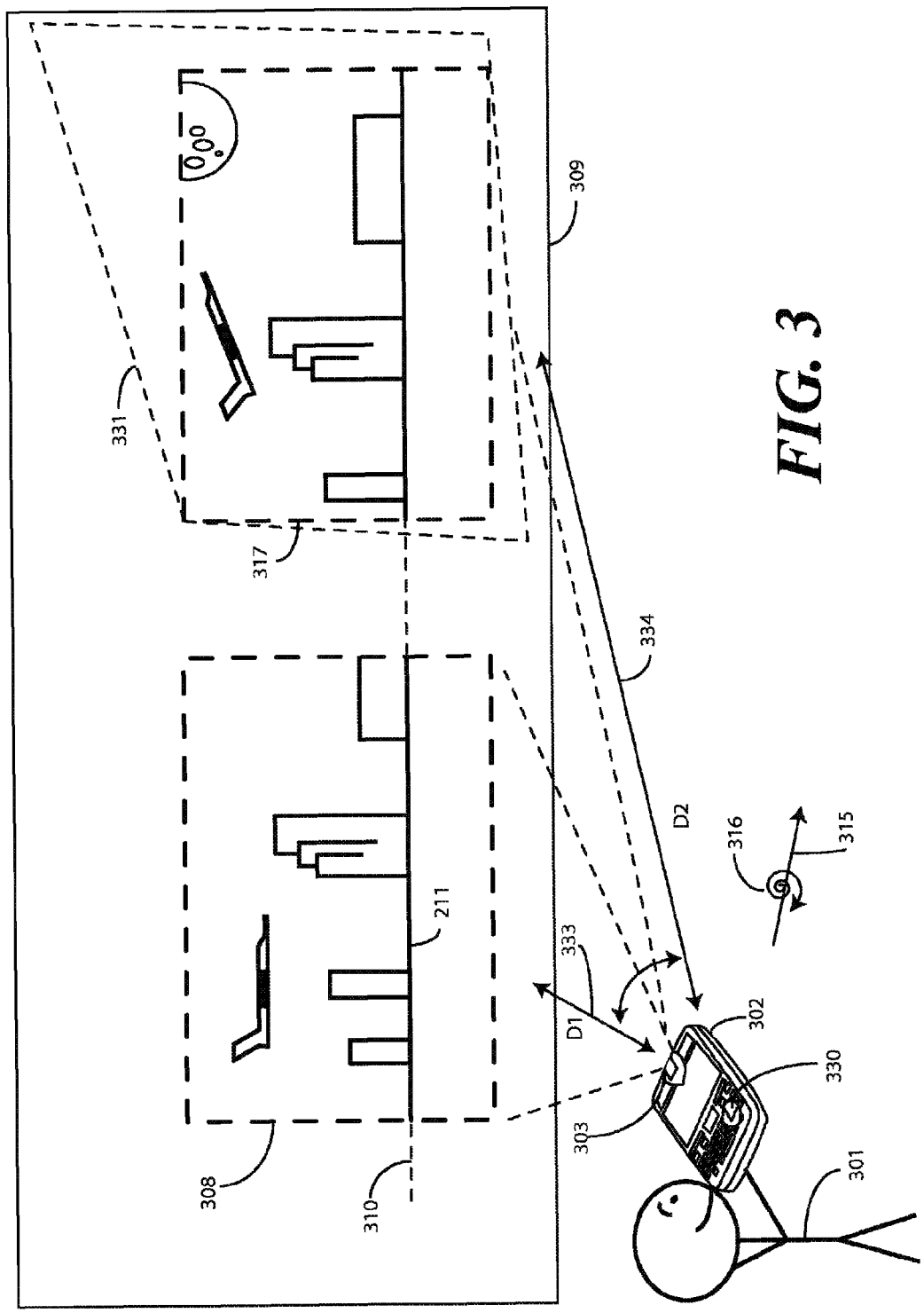
FIG. 3 illustrates one embodiment of a user employing another projection system configured in accordance with embodiments of the invention.

Turning now to FIG. 3, illustrated therein is another embodiment of the invention. In FIGS. 1 and 2, the images (117,217) changed with the movement of the projection system (103,203). Thus, while the reference lines (110,210) remained in their orientations, the second image (117) of FIG. 1 turned down and the second image (217) of FIG. 2 turned up with the change in roll of the projection system (103,203). In the embodiment of FIG. 3, the projection system 303 of the electronic device 302 is configured to be operable with an image compensator 330. The image compensator 330 can be configured in hardware, such as with an application specific integrated circuit or programmable logic, or can be configured as executable code operable with the processor or image orientation device.

The image compensator 330, in one embodiment, is configured to maintain a projection characteristic of an image 308 displayed on the projection surface 309. Projection characteristics can include image intensity, size, shape, lateral alignment or relative yaw, vertical alignment or relative pitch, rotational alignment or relative roll, and so forth. Where the projection system 303 is a laser-based projection system, such as the MEMS-based laser system described above, the projection system 303 will inherently include an relatively long depth of focus. Accordingly, focus may not need to be adjusted as a projection characteristic.

The illustrative embodiment of FIG. 3 is essentially the same as that of FIG. 2. A first image 308 is projected on the projection surface 309. The user 301 then moves 315 the projection system 303 to the right to change the yaw and rotates 316 the projection system 303 counterclockwise to change the pitch. Without the image compensator 330, the second image 317 would accordingly have a distorted, non-rectangular shape, as shown by dashed line 331. However, in the embodiment of FIG. 3, the image compensator 330 has corrected the brightness, color intensity, image content and border shape of the image 317 to accommodate for the new angle 333 of the projection surface 309 from the projection system 303 and new distance of the projection surface 309 from the projection system 303. Accordingly, the second image 317 still appears as a horizontal rectangle with the reference line 310 aligned appropriately.

The relationship between the projection surface 309 and projection system 303 can be determined with the use of a detector, as will be shown in FIG. 5 below. Such detectors are capable of determining the orientation of the projection system 303 along with the distances to the projection surface 309 and providing this information to the image compensator 330. Where the image projector is a MEMS system such as the PicoP™ laser-based system manufactured by Microvision, Inc., the image projector is readily able to focus at a wide range of distances. Similarly, such systems are capable of changing shape and intensity so as to be projected on any of a variety of projection surfaces quickly or even simultaneously.

Figure 4:
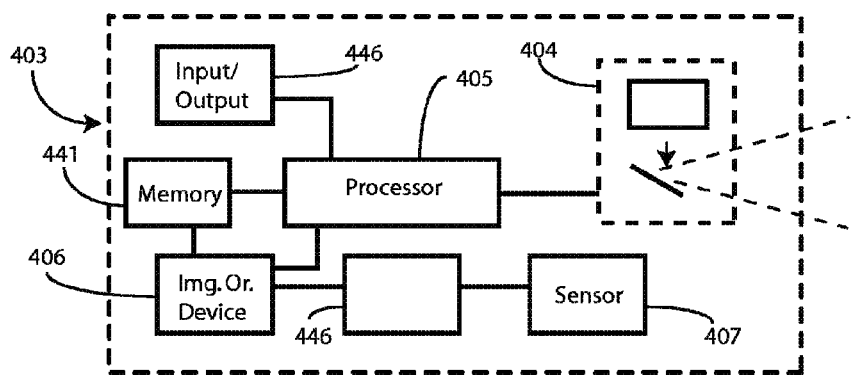
FIG. 4 illustrates a schematic block diagram of one embodiment of a projection system configured in accordance with embodiments of the invention.

Turning now to FIG. 4, illustrated therein is a schematic block diagram of one embodiment of a projection system 403 configured in accordance with embodiments of the present invention. The projection system 403 of FIG. 4 includes an image projector 404, a processor 405, an image orientation module 406, and a sensor 407. Other components can be included as well, such as input and output devices 440, a memory 441 for storing content and executable code, and so forth.

The processor 405 may be a microcontroller, a microprocessor, ASIC, logic chip, or other device, serves as the brain of the projection system 403. The processor 405 can include other processing units dedicated to performance of specific functions. For example, an integrated or stand-alone image content processor may handle the processing of stored or incoming image or video signals or data. In one embodiment, the processor 405 can be configured as an integrated circuit. It shall be understood to be representative of any processing architecture known to those skilled in the art.

The processor 405 can be a single processor, such as a microprocessor integrated circuit, or alternatively may comprise one or more processing units or components. In one embodiment, the processor 405 is coupled to a memory 441 or other computer readable medium. By executing operable code stored in the memory 441, in one embodiment the processor 405 is capable of causing the various components of the projection system 403 to execute their respective functions.

The memory 441 may comprise one or more memories. For example, the memory 441 may comprise a separate and distinct integrated circuit connected and operable with the processor 405 via a data bus. Further, the memory 441 may include one or more read-only memories, dynamic or static random-access memory, or any other type of programmable memory, such as one or more EPROMs, EEPROMs, registers, and the like. In some embodiments, the memory 441 can comprise non-traditional storage devices as well The routines stored in the memory 441 can be stored in the form of executable software, firmware, or in any other fashion known to those skilled in the art.

In one embodiment, the image orientation device 406 is configured as executable code. Accordingly, the image orientation device 406 can be stored in the memory 441 so as to be executed by the processor 405. In another embodiment, the image orientation device 406 can be configured as an application specific component that can be optionally integrated with the processor 405.

Figure 6:
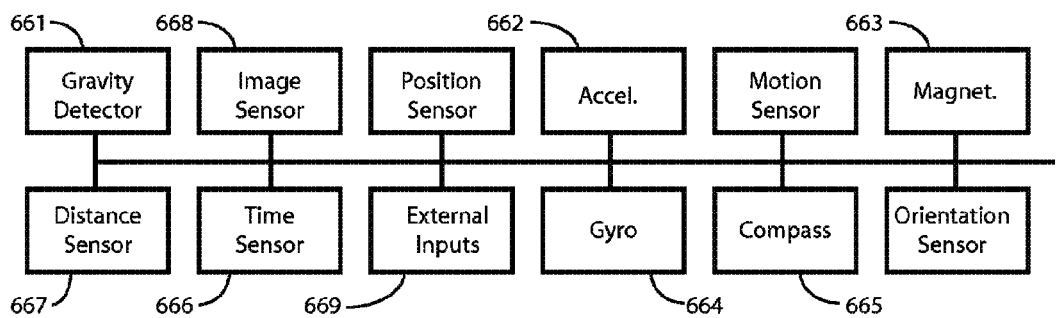
FIG. 6 illustrates a schematic block diagram of an illustrative sensor, shown with components that can be used therein in various combinations, in accordance with embodiments of the invention.

The sensor 407 can include a variety of components. Turning briefly to FIG. 6, illustrated therein are the various components that may comprise the sensor 407. The components shown are not intended to be limiting, as it will be clear to those of ordinary skill in the art having the benefit of this disclosure that other components imparting spatial awareness can also be included.

The components shown in FIG. 6 include a gravity detector 661, an accelerometer 662, a magnetometer 663, a gyroscope 664, a compass 665, a time sensor 666, a distance sensor 667, an image sensor 668, and external input sensors 669. Each of these components is known in the art, and will not be described in detail. Other devices not shown, such as a global positioning system (GPS) device, lasers, radars, electromagnetic sensors, altimeters/barometers, rangefinders, directional microphones, internal visual or non-visual (e.g., sonic) movement detectors, external visual or non-visual (e.g., sonic) movement detectors, and so forth can be used as well.

Motion sensors can include any type of device capable of providing motion information. Motion may be measured as a change in position or orientation over time. For example, a motion sensor may include the gyroscope 664, working in conjunction with the magnetometer 663.

Orientation sensors can include any type of device capable of providing orientation information. Local orientation may be considered relative or absolute. Orientation information in one embodiment may be gathered using a second set of positional sensors, e.g., either a second gyroscope or an array of accelerometers. Thus, the sensor 407 can establish its front facing with respect to its back facing.

The time sensor 666 can include an internal device, such as a digital clock, atomic clock or analog chronometer, or by reference to an external time source, such as a radio clock, a Loran clock, a cellular network's clock, the GPS clock, or the Network Time Protocol (NTP) and Simple Network Time Protocol (SNTP) of the World Wide Web.

Some or all of these components can be used as the sensor 407. Multiples of each component can be used to increase accuracy. The sensor 407 can be integrated with the image orientation device (406) as well.

Turning now back to FIG. 4, one or both of the processor 405 or the image orientation device 406 becomes "spatially aware" of the projection system 403 through data provided from the sensor 407. This spatial awareness can include positional awareness, motion awareness, and orientation awareness.

The image projector 404, in one embodiment, is configured as a MEMS scanning mirror, such as those manufactured by Microvision, Inc. Examples of MEMS scanning mirrors, such as those suitable for use with embodiments of the present invention, are set forth in commonly assigned, copending U.S. patent application Ser. No. 11/775,511, filed Jul. 10, 2007, entitled "Substrate-Guided Relays for Use with Scanned Beam Light Sources," which is incorporated herein by reference, and in US Pub. Pat. Appln. No. 2007/0159673, entitled, "Substrate-guided Display with Improved Image Quality," which is incorporated herein by reference.

As noted above, while a MEMS scanning mirror system is one suitable image projector 404, it will be clear to those of ordinary skill in the art having the benefit of this disclosure that the invention is not so limited. Other types of image projectors, such as two mirror projectors, grading light valve projectors, digital light projection technology systems, or liquid crystal on silicon (LCoS)-based projectors can also be used.

The image orientation device 406 is configured to modify the content being projected by the projection system 403 based upon data from the sensor 407. As described above, this can include ensuring that a reference line (110) remains stable regardless of the motion of the projection system 403.

In one embodiment, the image orientation device 406 is configured with hysteresis. This hysteresis can dampen minimal motions of the projection system 403 by causing the image content not to change until at least a predetermined movement of the projection system 403 has occurred. Using a star-lit night sky as an example of image content, a first image projected by the projection system 403 may be the constellation Orion. Minimal movement of the projection system 403 will not change the content—the image will still be Orion. However, once the projection system 403 has moved at least a predetermined amount, such as five degrees for example, the constellation may transition to Canis Major, the "Greater Dog," which includes Sirius, the brightest star in the sky.

A second image orientation device 446 can also be included. While the first image orientation device 406 is configured to keep a reference line associated with an image stable regardless of motion of the projection system 403, the second image orientation device 446 is configured to do the opposite. When the user moves the projection system 403, the second image orientation device 446 is configured to make one or more portions of the image not associated with the reference line move. Thus, the second image orientation device 446 is capable of giving the airplane (220) of FIG. 2 its motion.

Figure 5:
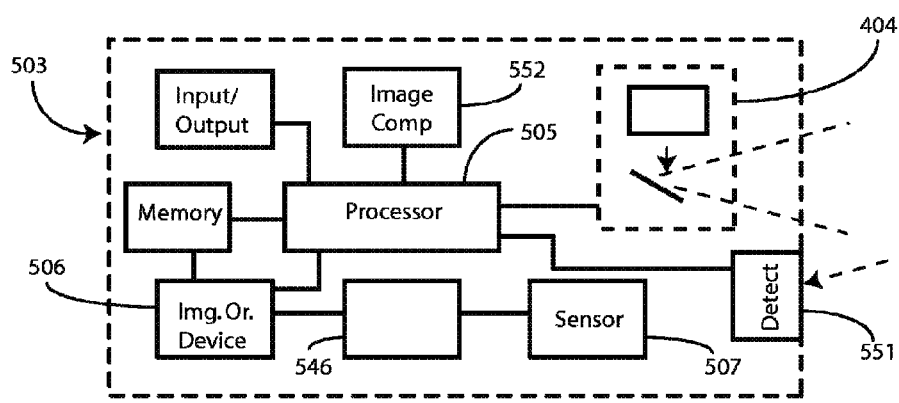
FIG. 5 illustrates another schematic block diagram of another embodiment of a projection system configured in accordance with embodiments of the invention.

Turning now to FIG. 5, illustrated therein is an alternate embodiment of a projection system 503 configured in accordance with embodiments of the invention. The embodiment of FIG. 5 is similar to that of FIG. 4, in that it includes an image projector 404, a processor 505, an image orientation device 506, an optional second image orientation device 546, and a sensor 507. However, the projection system 503 of FIG. 5 differs in that it has an image compensation module 552 as well. As described above, the image compensation module 552 is configured to maintain a projection characteristic of an image projected on a projection surface as the projection system 503 moves.

In the illustrative embodiment of FIG. 5, the image compensation module 552 is configured to be operable with a detector 551. The detector 551 serves as one type of location sensor, as it is capable of determining for example the distance between various segments of the projection surface and the projection system 503. Such a configuration would be suitable for use in FIG. 3 described above.

In one embodiment, the detector 551 can comprise a photodetector that precisely records the time it received the reflection of a pulse of light projected by image projector 404. Time information gathered from this photodetector can be used by the processor 505 to determine the distance between various segments of the projection surface. The image compensation module 552 can then compensate the brightness of the image in accordance with this information as described above. In a second embodiment, the detector 551 can comprise a device such as CMOS-imager capable of generating signals corresponding to reflected light from the projection surface. Intensity information from these signals can be used by the processor 505 to determine, for example, the color of the projection surface. The image compensation device 552 can then compensate the color palette of the image in accordance with this information as described above.

Figure 7:
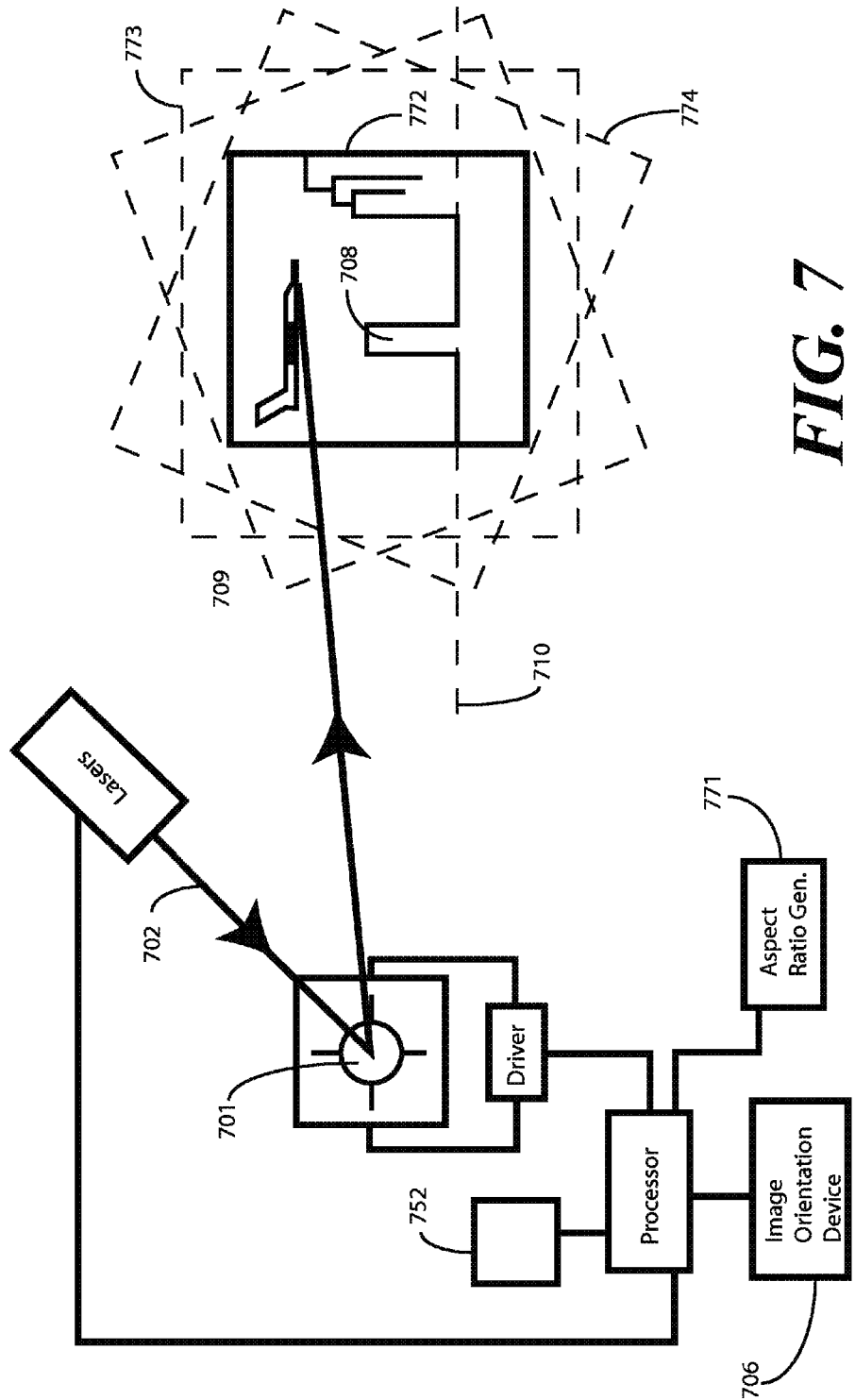
FIG. 7 illustrates a block diagram of one illustrative laser-based projection system configured in accordance with embodiments of the invention.

Turning now to FIG. 7, illustrated therein is another embodiment of the invention. In the embodiment of FIG. 7, the projection system 703 employs an aspect ratio generator 771 to determine an aspect ratio 772 of an image 708 within which a reference line 710 may be maintained by the image orientation device 706.

FIG. 7 further illustrates one embodiment of an image projector. Specifically, the image projector of FIG. 7 includes a MEMS scanning mirror 701. The MEMS scanning mirror 701 scans the light from one or more lasers 702 onto a display surface 709 to create an image 708.

In one embodiment, the one or more laser sources 702 comprise a red laser, a blue laser, and a green laser. Note that where lasers are used as light sources, the lasers can be any of various types of lasers. For example, in one embodiment, each laser source is a semiconductor laser, as these lasers are small and efficient. Edge-emitting lasers can be used as the laser sources, as can vertical cavity surface emitting lasers. Such semiconductor lasers are well known in the art and are commonly available from a variety of manufacturers.

The MEMS scanning mirror 701 is then configured to produce the image 708 by pivoting on its axes to spatially or angularly encode the light from the laser sources along the projection surface 709. In one embodiment, the MEMS scanning mirror 701 is responsive to magnetic fields generated by a control signal and pivots about a first axis and a second axis in response to the control signal. This pivoting action scans the light horizontally and vertically, and in one embodiment, in a raster pattern to form the image 708.

The aspect ratio generator 771 can be used to optimize a "window" opening from the projection system 703 in which the reference line 710 may be maintained. To explain, consider the projection system to have a maximum extent 773 of projection capability. If the image 708 fills this extent, when the projection system 703 is rotated, the extent would rotate accordingly, for example to extent 774 with clockwise rotation.

In one embodiment of the invention, however, an image compensation device 752 works to preserve a projection characteristic of the image 708. An example of the projection characteristic can be image shape. To ensure that this can be accomplished through a variety of rotational positions, the aspect ratio generator 771 can be configured to create an ideal window opening that is smaller than the extent 773 so that the resulting image 708 is not clipped or skewed when the image compensation device 752 applies compensation.

The image 708 of FIG. 7 has been configured as a square. This is a traditional shape and can result in a pleasing appearance when a reference line 710 such as a horizon is stabilized therein by way of the image stabilization device 706. It will be clear to those of ordinary skill in the art having the benefit of this disclosure that other shapes are available as well. For example, the shape could be a circle as well, which maximizes the vertical dimension of the image 708. Such a shape can be visually pleasing in some applications, as it would appear as a flashlight beam illuminating the projected image.

Figure 8:
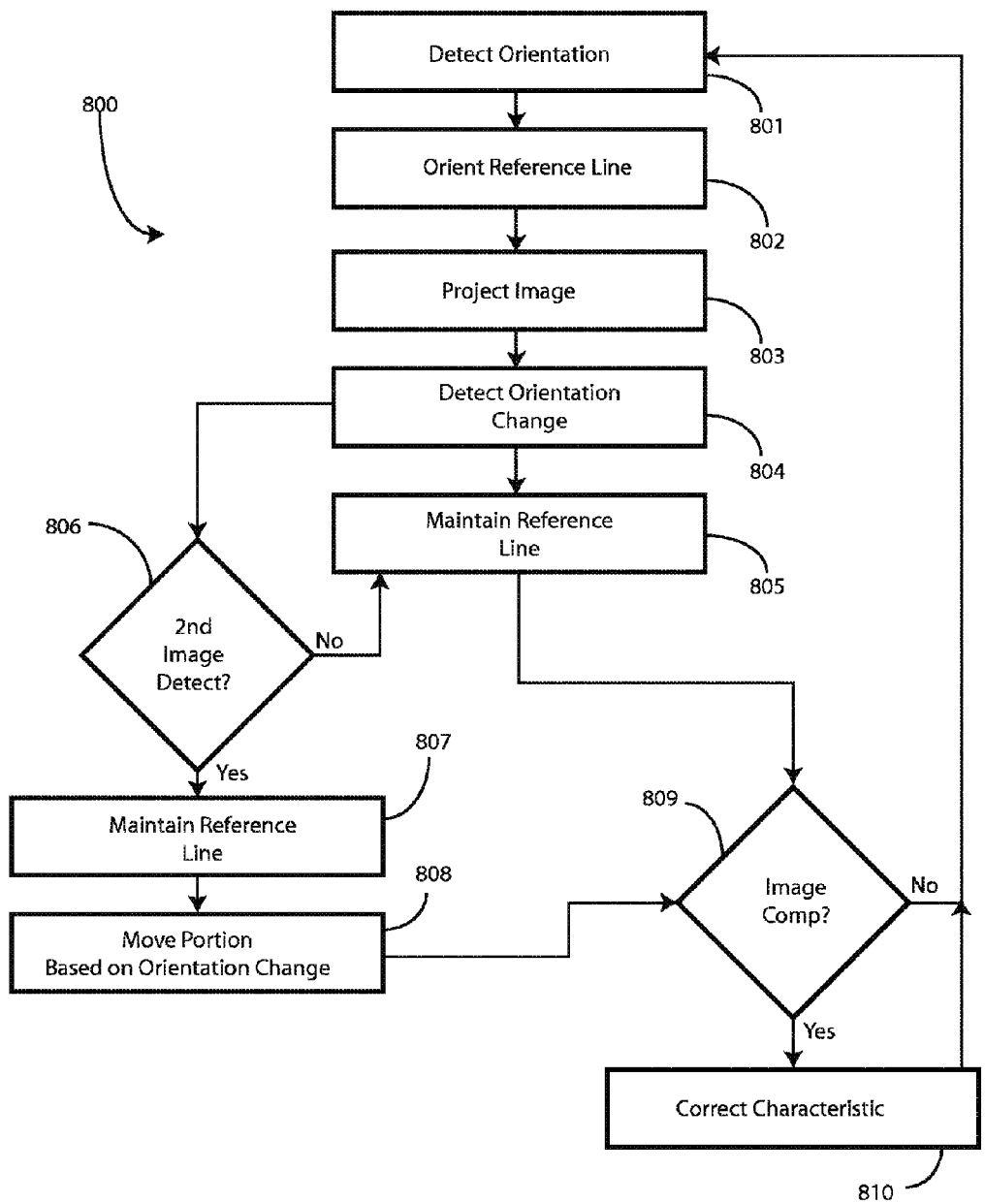
FIG. 8 illustrates one method for maintaining a reference alignment in a projected image as a projection system moves in accordance with embodiments of the invention.

Turning now to FIG. 8, illustrated therein is one method 800 of projecting an image from a projection device in accordance with embodiments of the invention. The method 800 is suitable for coding as executable code for a processor, such as the processor (405) of FIG. 4. The method 800 can be embodied, for example, in computer-readable media such as computer storage media and communication media. The method 800 may be configured as computer-readable instructions, data structures, program modules or other data.

At step 801, a projection device detects its orientation. As noted above, this can include positional orientation, rotational orientation, location, motion, or combinations thereof. One or more sensors can be used to determine orientation. For example, in one embodiment, this step 801 includes determining a direction of gravity with a gravitational direction detector.

At step 802, which can occur concurrently with step 801, an image orientation device within the projection device causes at least a reference line associated with the image to be presented relative to the projection device orientation so as to have a predetermined projection surface orientation. Using a landscape horizon as an example reference line, if the projection device determines its orientation at step 801 by determining a direction of gravity, step 802 may comprise orienting the horizon perpendicular with the direction of gravity such that its predetermined projection surface orientation is horizontal. Similarly, where the reference line comprises the side of a building, if the projection device determines its orientation at step 801 by determining a direction of gravity, step 802 may comprise orienting the edge of the building parallel with the direction of gravity such that its predetermined projection surface orientation is vertical. At step 803, the projection device projects an image. The image can be still content or video content. The image may be recorded data or generated data.

At step 804, the projection device determines that it has moved. The movement can be in any of multiple dimensions. It can be translation along the x-axis, y-axis, or z-axis, and can also be rotation along any of these axes. As with step 801, the motion determination can occur with the assistance of one or more sensors.

At step 805, the image orientation module of the projection device causes the reference line to remain in the predetermined projection surface orientation. In one embodiment, this step 805 includes altering the content being presented such that the reference line moves counter to the motion detected at step 804. For example, if the motion detected at step 804 is a clockwise rotation of the projection device, step 805 will result in a counterclockwise rotation of the reference line such that the reference line remains in its predetermined projection surface orientation.

Step 805 can further include an enhancement of the translation of content within the image as well. As will be described below, an augmentation compensator can be included to increase, decrease, or otherwise affect the translation of image content to allow the user to project a wider array of views on a give projection surface. Where such an augmentation compensator is included, step 805 can include a corresponding enhancement of image content translation. The augmentation compensator can be selectively actuated by a user in one embodiment.

As noted above, a second image orientation device can be included, as determined at decision 806. Where this is the case, two differing actions can occur. For portions of the image associated with the reference line, these portions will be maintained in their predetermined projection surface orientation at step 807. As described above, portions of the image not associated with the reference line can change at step 808 based upon the motion detected at step 804. For example, in one embodiment, the second image orientation device can be configured at step 808 to cause the portions of the image not associated with the reference line to move as the projection device orientation changes. Step 808 can be configured with hysteresis such that portions of the image not associated with the reference line change orientation only where at least a predetermined minimum amount of projection orientation change is detected at step 804.

As also noted above, the projection device can optionally include an image compensation device, as determined at decision 809. Where this is the case, the image compensation device can be configured to cause one or more image characteristics to remain stable as the projection device orientation changes. An example of this is maintaining the brightness, colors, size, shape, or combinations thereof, of the image constant. To accomplish this in a variety of situations, an aspect ratio generator may be used to set an image size to be less than an aspect or maximum size of the projection device as well.

Embodiments of the present invention allow all or portions of an image to remain stable relative to the "real world," i.e., relative to the projection surface. Embodiments of the invention allow image content to change when the projection device moves to the right or left, as if a viewer were looking right or left. However, portions of the image associated with a reference line always stay level, thereby resulting in an image that appears stable even though its location and content may change.

Figure 9:
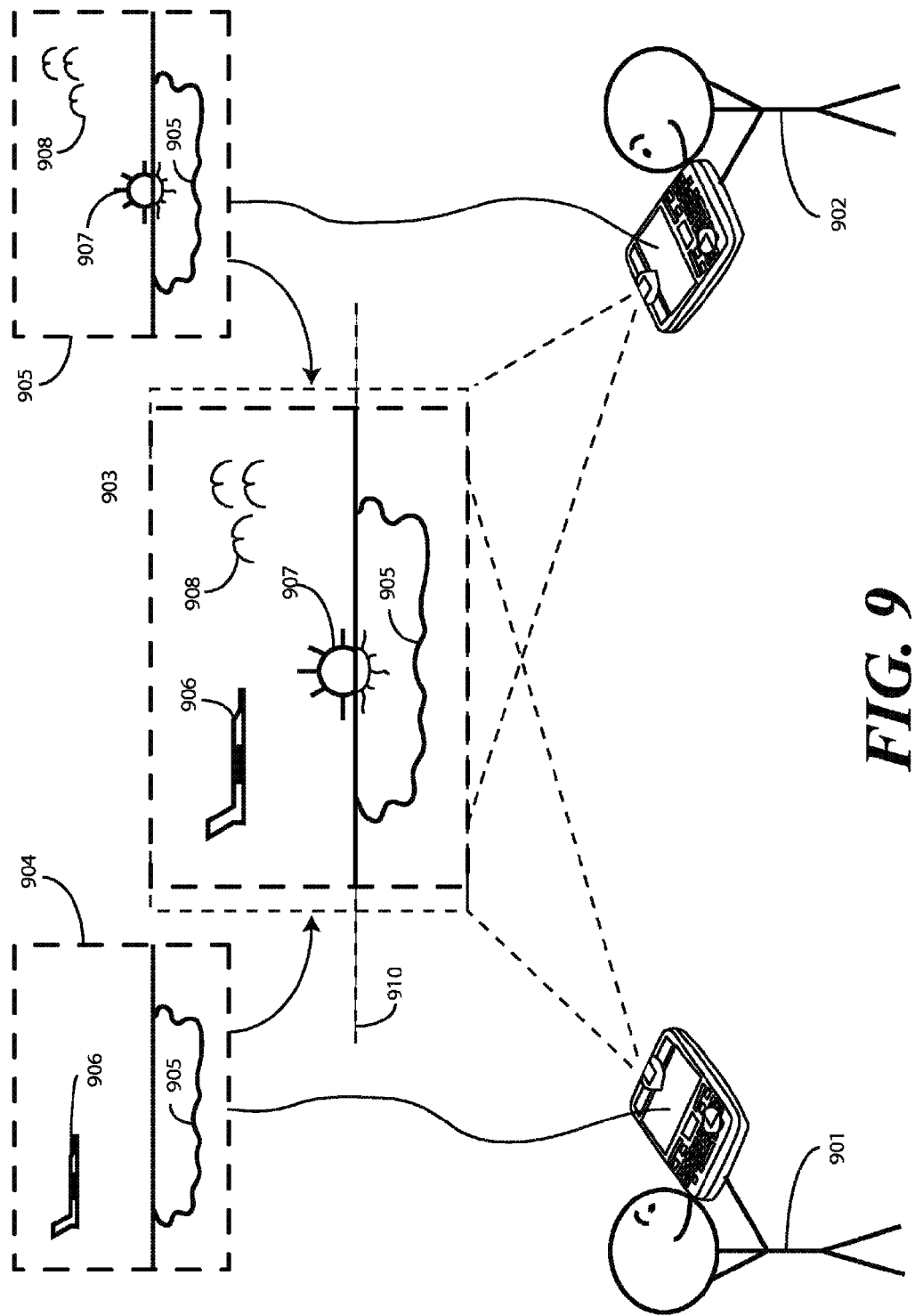
FIG. 9 illustrates one application illustrating some of the advantages of projection systems configured in accordance with embodiments of the present invention.

Turning now to FIG. 9, illustrated therein is one advantage offered by embodiments of the present invention when compared to prior art inventions. In the application shown in FIG. 9, two users 901,902 project a joint image 903 that is comprised of two images 904,905 that at least partially overlap. The first user's image 904 is of a lake 905 on a clear day with an airplane 906 passing thereover. The second user's image 905 is of the same lake 905 with the sun 907 setting behind the horizon and casting a reflection on the water, as birds 908 are passing overhead.

In each user's image 904, 905, a reference line 910 has been set as the horizon of the image. Thus, when the images 904, 905 overlap to form the joint image 903, the reference line is potentially parallel, and can be manually aligned. Thus, the lake 905 can appear as a single lake. Likewise, the airplane 906 of the first user's image 904 appears in joint image 903, as do the sun 907 and birds 908 from the second user's image 905. Embodiments of the present invention may also make vertical alignment automatic, as the image orientation devices within each user's device orient the reference lines in image 904 and 905 automatically. However, to align the borders 904 and 905 into a single border 903, and to align the two horizontal lines as a single line 910 may require the devices to communicate with each other.

Where a user's device is equipped with a second image orientation device, that user can impart motion as described above. For example, if the first user's device includes a second image orientation device, the first user 901 can make his airplane move towards the birds. Such an application may be useful in Federal Aviation Administration or military presentations for example. In a similar manner, such techniques may be useful in medical applications: for example, practicing surgical techniques with a joint image 903 based on a computerized tomography scan. Such applications are impossible with prior art projectors.

Additional features are possible in projection systems configured in accordance with embodiments of the present invention. In one embodiment, the projection system can be configured with an augmentation compensator to facilitate ease of movement over wide ranges. Consider the situation in which a user wishes to change a projected scene by sixty degrees or more. Where this is the case, substantial yaw movement can be cumbersome. The activation of the augmentation compensator can enhance scene translation in response to changes in yaw, pitch, or roll. In this example, the user may configure the augmentation compensator to magnify changes in projected image based upon changes in projector system motion. Thus, to change a field of view by sixty degrees, the user may only have to change the orientation of the projection system by, for example, six degrees when the augmentation compensator is active.

Figure 10:
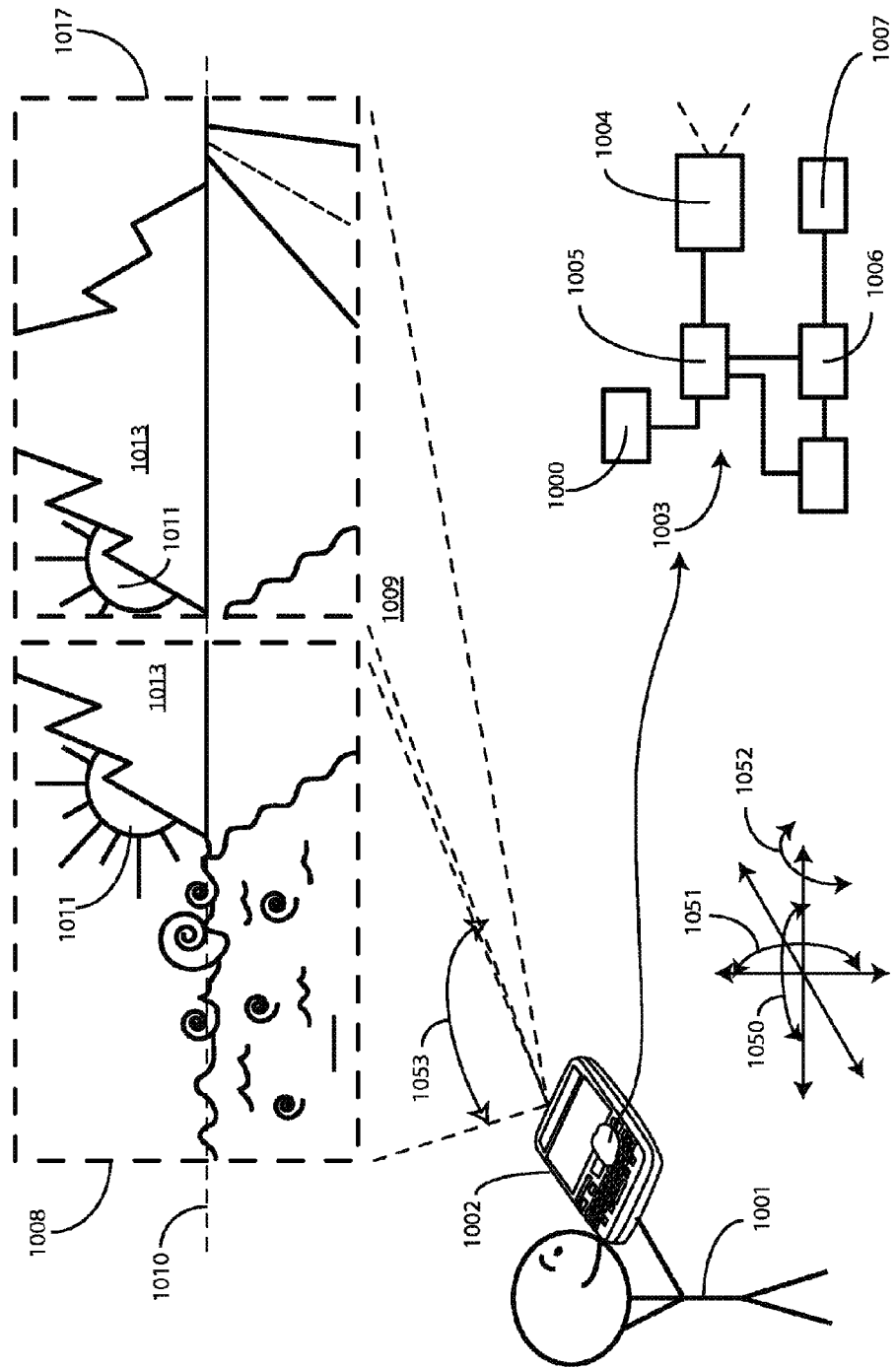
FIG. 10 illustrates a projection system employing an augmentation compensator in accordance with one embodiment of the invention.

Turning now to FIG. 10, illustrated therein is one embodiment of the augmentation compensator 1000 in action. In FIG. 10, a user 1001 is employing a hand-held electronic device 1002 having one embodiment of a projection system 1003 configured in accordance with embodiments of the invention and employing an augmentation compensator 1000. As with previously described projection systems, the illustrative projection system 1003 of FIG. 10, which is shown to the right in an enlarged view, includes an image projector 1004, a processor 1005, and an image orientation device 1006.

The augmentation compensator 1000, which is operable with the processor 1005, can be configured to amplify, reduce, or otherwise alter the amount that the projected image 1008 changes with changes in yaw, pitch, and roll of the projection system 1002. For the purposes of illustration, presume that the augmentation compensator 1000 in this embodiment is configured to, where active, amplify changes in the projected image 1008 by a factor of ten. It will be clear to those of ordinary skill in the art having the benefit of this disclosure that enhancements other than magnification can be enabled with the augmentation compensator 1000 as well.

As with systems described above, the sensor 1007 delivers spatial awareness information to the image orientation device 1006. This information can include information relating to changes in yaw 1050, pitch 1051, or roll 1052 of the projection system 1003. This information can also include the direction of gravity.

The image projector 1004 is configured to project an image 1008 on a projection surface 1009. The image 1008 includes a reference line 1010 associated therewith. The reference line 1010 can be any of a horizon, a landscape delimiter, a three-dimensional surface, or a user-defined reference line. It can rather be a multi-segmented line or curved non-linear line as well.

As the projection system 103 moves by changing one or more of the yaw 1050, pitch 1051, or roll 1052, the image orientation device 1006 is configured to cause the reference line 1010 associated with the image 1008 to remain aligned in a predetermined orientation along the projection surface 1009. At the same time, the spatially aware system detects changes in the relative yaw, pitch, and roll of the projection system 1003. The image orientation device 1006 is therefore able to change the content being shown, as well as other aspects of the image such as focus or framing, to present an image having a reference line 1010 that stays substantially stable.

In the illustrative embodiment of FIG. 10, the user 1001 has actuated the augmentation compensator 1000. This can be done through controls on the hand-held electronic device 1002. The augmentation compensator 1000 is configured to amplify the change in the projected image based upon an amount of device movement. In FIG. 10, the user has changed the yaw 1050 by an angle of six degrees. The augmentation compensator 1000 then causes the content of the image to change by ten fold. Thus, while the hand-held electronic device 1002 has moved six degrees, the content of the second image 1017 has apparently changed by sixty degrees. This can be seen in FIG. 10 by the dramatic movement of the sun 1011 and mountains 1013. The augmentation compensator 1000 thereby allows the user 1001 to show wide ranges of motion without needing a wide-angle projection surface. The user 1001 can deactivate the enhancement of motion by turning off the augmentation compensator 1000.

In this illustrative embodiment, the augmentation compensator 1000 is acting on changes in yaw 1050. It will be obvious to those of ordinary skill in the art having the benefit of this disclosure that the augmentation compensator 1000 can work on pitch 1051 and roll 1052 as well. Where the augmentation compensator 1000 is configured to work on pitch 1051, the reference line 1010 will move within the image.

It can be desirable to, upon turning the augmentation compensator 1000 off, to be able to project the reference line 1010 in substantially the same location that it was prior to actuating the augmentation compensator 1000. To accommodate this, in one embodiment, the processor 1005 is configured to maintain an absolute reference with respect to the reference line 1010. Once the augmentation compensator 1000 is turned off, the reference line 1010 returns to an original orientation in accordance with the absolute reference. Thus, if the reference line 1010 started in the middle of the projection surface 1090, regardless of the action taken by the augmentation compensator 1000, once deactivated, the reference line 1010 returns to the middle of the projection surface 1090. This enables the user 1001 to quickly and accurately return the reference line 1010 to its original position.

Figure 11:
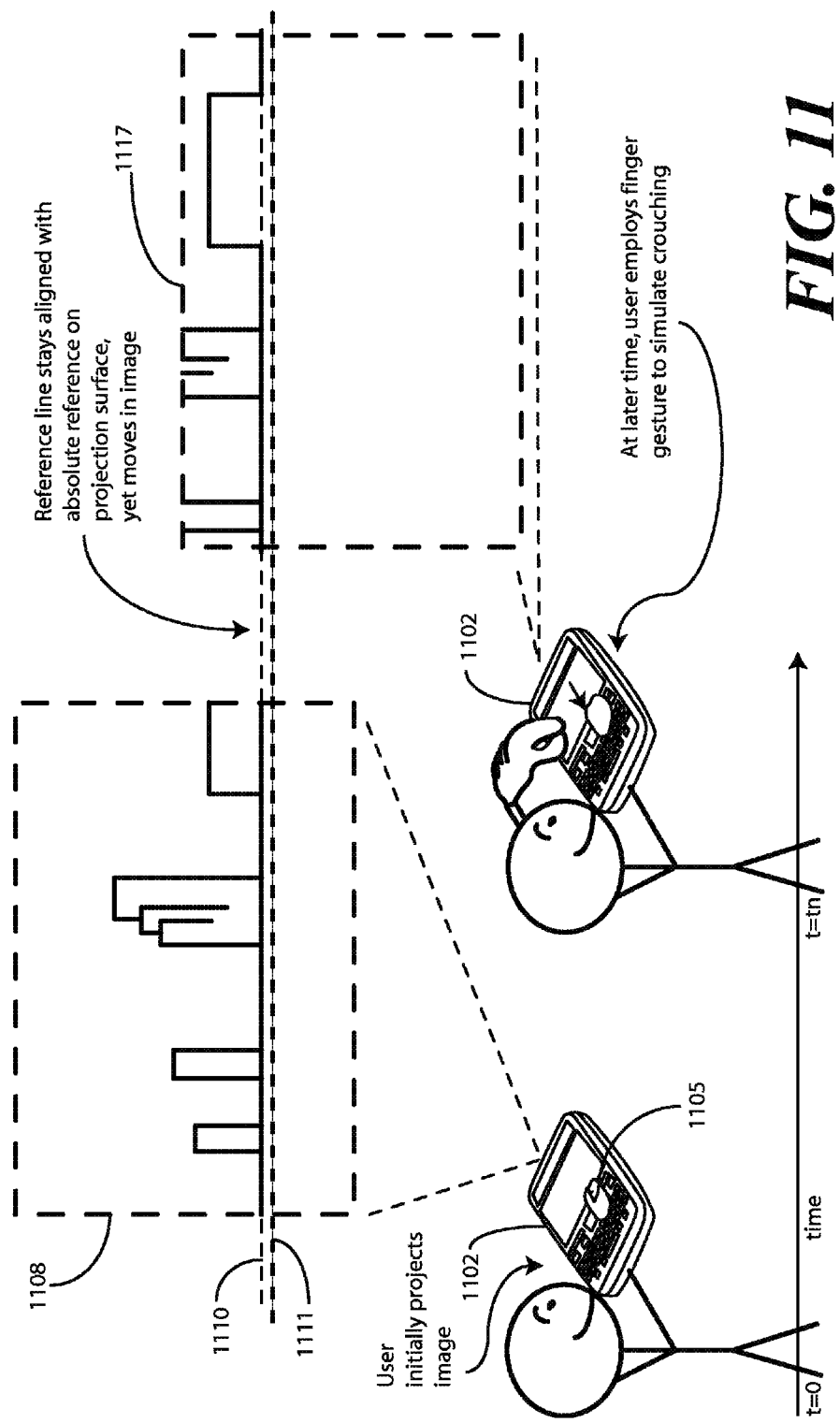
FIG. 11 illustrates a projection system employing an absolute reference in accordance with one embodiment of the invention.

Turning now to FIG. 11, illustrated therein is an embodiment demonstrating the absolute reference feature of embodiments of the invention. In FIG. 11, the processor 1105 is configured to store an absolute reference 1111 with respect to the reference line 1110. Thus, in addition to keeping the reference line 1110 substantially oriented relative to an image 1108, the reference line 1110 is kept substantially oriented relative to the projection surface as well. Thus, when a user crouches, which can alternatively be achieved through a finger gesture or other control of the hand-held electronic device 1102, the reference line rises in the image, as shown in image 1117.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. A projection system comprising:
an image projector to project video content;
a processor to compare successive images of the video content to determine a non-changing portion, and to assign an object within the non-changing portion as a reference line;
at least one sensor to detect position, motion, or orientation of the image projector; and
an image orientation device configured to modify the video content in response to information provided by the at least one sensor to cause the reference line projected by the image projector to remain aligned in a predetermined orientation along a projection surface regardless of yaw, pitch, or roll corresponding to the image projector.

2. The projection system of claim 1, wherein the at least one sensor comprises a gravity direction detector.

3. The projection system of claim 2, wherein the predetermined orientation is based upon a direction of gravity determined by the gravity direction detector.

4. The projection system of claim 3, wherein the reference line corresponds to a landscape delimiter within the image.

5. The projection system of claim 4, wherein the landscape delimiter comprises at least one of a horizon within the image or a three-dimensional object within the image.

6. The projection system of claim 1, wherein the at least one sensor comprises one or more of an accelerometer, a magnetometer, a gyroscope, a compass, or a CMOS imager.

7. The projection system of claim 1, further comprising an image compensator configured to maintain a projection characteristic of the image on the projection surface as the projection system moves relative to the projection surface.

8. The projection system of claim 7, wherein the projection characteristic comprises a rotational alignment.

9. The projection system of claim 7, wherein the projection characteristic comprises an image size.

10. The projection system of claim 1, further comprising an aspect ratio generator configured to determine an aspect ratio of the image within which the reference line may be maintained by the image orientation device.

11. The projection system of claim 1, further comprising an augmentation compensator configured to enhance scene translation in response to changes in one or more of the yaw, the pitch, or the roll of the projection system.

12. The projection system of claim 11, wherein the augmentation compensator is configured to enhance scene translation by one of magnifying or reducing the one or more of the yaw, the pitch, or the roll of the projection system.

13. A method of projecting video content from a projection device, comprising:
comparing successive images of the video content to determine a non-changing portion;
assigning an object within the non-changing portion as a reference line;
detecting a projection device orientation;
modifying the video content in response to the device orientation to cause at least the reference line within the image to be presented relative to the projection device orientation so as to have a predetermined projection surface orientation; and
modifying the video content in response to the device orientation to cause the reference line to remain in the predetermined projection surface orientation as the projection device orientation changes.

14. The method of claim 13, further comprising causing one or more portions of the image not associated with the reference line to change orientation as the projection device orientation changes.

15. The method of claim 14, wherein the causing the one or more portions of the image not associated with the reference line to change orientation occurs only where at least a predetermined minimum amount of projection device orientation change is detected.

16. The method of claim 13, further comprising causing an image characteristic to remain stable as the projection device orientation changes.

17. The method of claim 13, further comprising setting an image size that is less than a maximum image size of the projection device.

18. The method of claim 13, further comprising one of amplifying or reducing scene translation as the projection device orientation changes.

19. A projection system comprising:
an image projection device to project video content;
a processor to compare successive images of the video content to determine a non-changing portion, and to assign an object within the non-changing portion as a reference line;
at least one sensor to detect position, motion, or orientation of the image projector; and
a first image orientation device configured to modify the video content in response to information provided by the at least one sensor to cause at least one portion of an image generated by the image projection device corresponding to the reference line within the image to remain aligned in a predetermined orientation during movement of the projection system; and
a second image orientation device configured to modify the video content in response to information provided by the at least one sensor to cause at least one other portion of the image to change orientation based at least in part on movement of the projection system.

20. The projection system of claim 19, wherein the at least one sensor comprises a gravity direction detector, wherein the predetermined orientation is based upon a direction of gravity detected by the gravity direction detector.

21. The projection system of claim 19, wherein the reference line corresponds to a subject matter line of the image.

* * * * *